United States Patent
Park et al.

(10) Patent No.: US 10,658,114 B2
(45) Date of Patent: May 19, 2020

(54) CERAMIC CAPACITOR HAVING METAL OXIDE IN SIDE MARGIN PORTIONS, AND METHOD OF MANUFACTURING THE SAME

(71) Applicant: SAMSUNG ELECTRO-MECHANICS CO., LTD., Suwon-si, Gyeonggi-do (KR)

(72) Inventors: Yong Park, Suwon-si (KR); Ji Hong Jo, Suwon-si (KR); Ki Pyo Hong, Suwon-si (KR)

(73) Assignee: Samsung Electro-Mechanics Co., Ltd., Suwon-si, Gyeonggi (KR)

( * ) Notice: Subject to any disclaimer, the term of this patent is extended or adjusted under 35 U.S.C. 154(b) by 0 days.

(21) Appl. No.: 16/173,581

(22) Filed: Oct. 29, 2018

(65) Prior Publication Data

US 2020/0075254 A1    Mar. 5, 2020

(30) Foreign Application Priority Data

Aug. 29, 2018  (KR) .......... 10-2018-0101999

(51) Int. Cl.
*H01G 4/224*   (2006.01)
*H01G 4/30*    (2006.01)

(52) U.S. Cl.
CPC ............. *H01G 4/224* (2013.01); *H01G 4/30* (2013.01)

(58) Field of Classification Search
CPC ...... H01G 4/1227; H01G 4/008; H01G 4/232; H01G 4/30; H01G 4/224
See application file for complete search history.

(56) References Cited

U.S. PATENT DOCUMENTS 5,910,881 A *  6/1999  Ueno .............. H01G 4/30
                                       361/313
2008/0304204 A1* 12/2008 Suzuki ............ H01G 4/012
                                       361/321.3
(Continued)

FOREIGN PATENT DOCUMENTS

JP        06151234 A  *  5/1994
JP     2006-351639 A     12/2006
(Continued)

OTHER PUBLICATIONS

Office Action issued in related U.S. Appl. No. 16/274,782 dated Oct. 9, 2019.

*Primary Examiner* — David M Sinclair
(74) *Attorney, Agent, or Firm* — Morgan, Lewis & Bockius LLP

(57) ABSTRACT

A multilayer ceramic capacitor includes: a ceramic body including dielectric layers and having first and second surfaces opposing each other, third and fourth surfaces connecting the first and second surfaces to each other, and fifth and sixth surfaces connected to the first to fourth surfaces and opposing each other; a plurality of internal electrodes disposed in the ceramic body, each exposed to the first and second surfaces and having one ends exposed to the third or fourth surface; and a first side margin portion and a second side margin portion disposed, respectively, on the first and second surfaces of the ceramic body, wherein a metal or a metal oxide is disposed in each of the first and second side margin portions, and a ratio of a diameter of the metal or the metal oxide to a thickness of the dielectric layer is 0.8 or less.

18 Claims, 9 Drawing Sheets

(56) References Cited

U.S. PATENT DOCUMENTS

| | | | |
|---|---|---|---|
| 2009/0128988 A1* | 5/2009 | Sohn | C04B 35/468 361/321.4 |
| 2012/0234462 A1* | 9/2012 | Matsui | H01G 4/12 156/89.12 |
| 2012/0250217 A1* | 10/2012 | Fukunaga | H01G 4/012 361/301.4 |
| 2012/0250221 A1 | 10/2012 | Yamashita | |
| 2013/0094121 A1* | 4/2013 | Endo | H01G 4/30 361/305 |
| 2015/0340155 A1* | 11/2015 | Fukunaga | H01G 4/012 361/301.4 |
| 2016/0126014 A1* | 5/2016 | Lee | H01G 4/30 361/301.4 |
| 2016/0351335 A1* | 12/2016 | Kato | H01G 4/30 |
| 2018/0061575 A1* | 3/2018 | Mizuno | H01G 4/0085 |
| 2018/0108482 A1* | 4/2018 | Kogure | H01G 4/008 |
| 2018/0182549 A1* | 6/2018 | Koide | C04B 35/638 |

FOREIGN PATENT DOCUMENTS

| | | |
|---|---|---|
| JP | 2012-256647 A | 12/2012 |
| JP | 2013-149806 A | 8/2013 |
| JP | 2015006970 A * | 1/2015 |
| KR | 10-2010-0136917 A | 12/2010 |
| KR | 10-2012-0080657 A | 7/2012 |

* cited by examiner

CERAMIC CAPACITOR HAVING METAL OXIDE IN SIDE MARGIN PORTIONS, AND METHOD OF MANUFACTURING THE SAME

CROSS-REFERENCE TO RELATED APPLICATION(S)

This application claims the benefit of priority to Korean Patent Application No. 10-2018-0101999 filed on Aug. 29, 2018 in the Korean Intellectual Property Office, the disclosure of which is incorporated herein by reference in its entirety.

TECHNICAL FIELD

The present disclosure relates to a multilayer ceramic capacitor capable of having improved reliability through control of a size of a nickel particle or a nickel oxide disposed in a side margin portion disposed on a side surface of a ceramic body, and a method of manufacturing the same.

BACKGROUND

Generally, electronic components using a ceramic material, such as a capacitor, an inductor, a piezoelectric element, a varistor, a thermistor, and the like, include a ceramic body formed of the ceramic material, internal electrodes formed in the ceramic body, and external electrodes installed on surfaces of the ceramic body to be connected to the internal electrodes.

Recently, in accordance with miniaturization and multi-functionalization of electronic products, multilayer ceramic electronic components also tend to be miniaturized and multifunctionalized. Therefore, a multilayer ceramic capacitor having a small size and a high capacitance has been demanded.

In order to miniaturize the multilayer ceramic capacitor and increase capacitance of the multilayer ceramic capacitor, it has been required to significantly increase an electrode effective area (increase an effective volume fraction required for implementing capacitance).

In order to implement the miniature and high-capacitance multilayer ceramic capacitor as described above, in manufacturing the multilayer ceramic capacitor, a method of significantly increasing areas of internal electrodes in a width direction of a body through a design that does not have a margin by exposing the internal electrodes in the width direction of the body and completing the multilayer ceramic capacitor by separately attaching side margin portions to electrode exposed surfaces of the multilayer ceramic capacitor in the width direction in a process before sintering after the multilayer ceramic capacitor is manufactured has been used.

However, in such a method, in a process of forming the side margin portion, a metal included in the internal electrode or an oxide of the metal may be disposed in the side margin portion, and reliability of the multilayer ceramic capacitor may be decreased due to the metal or the oxide of the metal.

In detail, an effect of decreasing a distance between adjacent internal electrodes appears due to the metal or the oxide of the metal included in the side margin portion, such that electric field concentration is generated, resulting in a short-circuit.

Therefore, research into technology capable of improving reliability of a subminiature and high-capacitance multilayer ceramic capacitor by preventing a short-circuit in the multilayer ceramic capacitor has been required.

SUMMARY

An aspect of the present disclosure may provide a multilayer ceramic capacitor capable of having improved reliability by controlling a size of a nickel particle or a nickel oxide disposed in a side margin portion disposed on a side surface of a ceramic body, and a method of manufacturing the same.

According to an aspect of the present disclosure, a multilayer ceramic capacitor may include: a ceramic body including dielectric layers and having first and second surfaces opposing each other, third and fourth surfaces connecting the first and second surfaces to each other, and fifth and sixth surfaces connected to the first to fourth surfaces and opposing each other; a plurality of internal electrodes disposed in the ceramic body, each exposed to the first and second surfaces and having one end exposed to the third or fourth surface; and a first side margin portion and a second side margin portion disposed, respectively, on the first and second surfaces of the ceramic body, wherein a metal or a metal oxide is disposed in each of the first and second side margin portions, and a ratio of a diameter of the metal or the metal oxide to a thickness of the dielectric layer is 0.8 or less.

According to another exemplary embodiment in the present disclosure, a method of manufacturing a multilayer ceramic capacitor may include: preparing first ceramic green sheets on which a plurality of first internal electrodes patterns are disposed at predetermined intervals and second ceramic green sheets on which a plurality of second internal electrodes patterns are disposed at predetermined intervals; forming a ceramic green sheet multilayer body by stacking the first and second ceramic green sheets so that the first internal electrodes patterns and the second internal electrodes patterns intersect each other; cutting the ceramic green sheet multilayer body to have side surfaces on which distal ends of the first internal electrodes patterns and the second internal electrodes patterns are exposed in a width direction; forming a first side margin portion and a second side margin portion, respectively, on the side surfaces to which the distal ends of the first internal electrodes patterns and the second internal electrodes patterns are exposed; and preparing a ceramic body including dielectric layers and internal electrodes by sintering the cut ceramic green sheet multilayer body, wherein a metal or a metal oxide is disposed in each of the first and second side margin portions, and a ratio of a diameter of the metal or the metal oxide to a thickness of the dielectric layer is 0.8 or less.

According to still another aspect of the present disclosure, a multilayer ceramic capacitor may include: a ceramic body including dielectric layers and having first and second surfaces opposing each other, third and fourth surfaces connecting the first and second surfaces to each other, and fifth and sixth surfaces connected to the first to fourth surfaces and opposing each other; a plurality of internal electrodes disposed in the ceramic body, each exposed to the first and second surfaces and having one end exposed to the third or fourth surface; and a first side margin portion and a second side margin portion disposed, respectively, on the first and second surfaces of the ceramic body, wherein a metal or a metal oxide is disposed in each of the first and second side margin portions, and a diameter of the metal or the metal oxide is smaller than a thickness of each of the dielectric layers.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
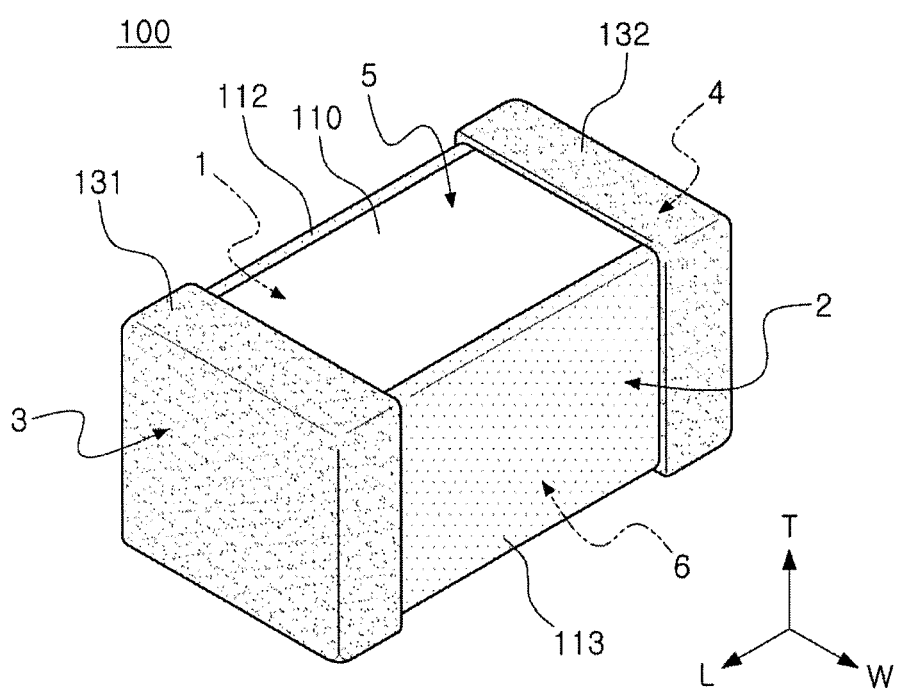
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
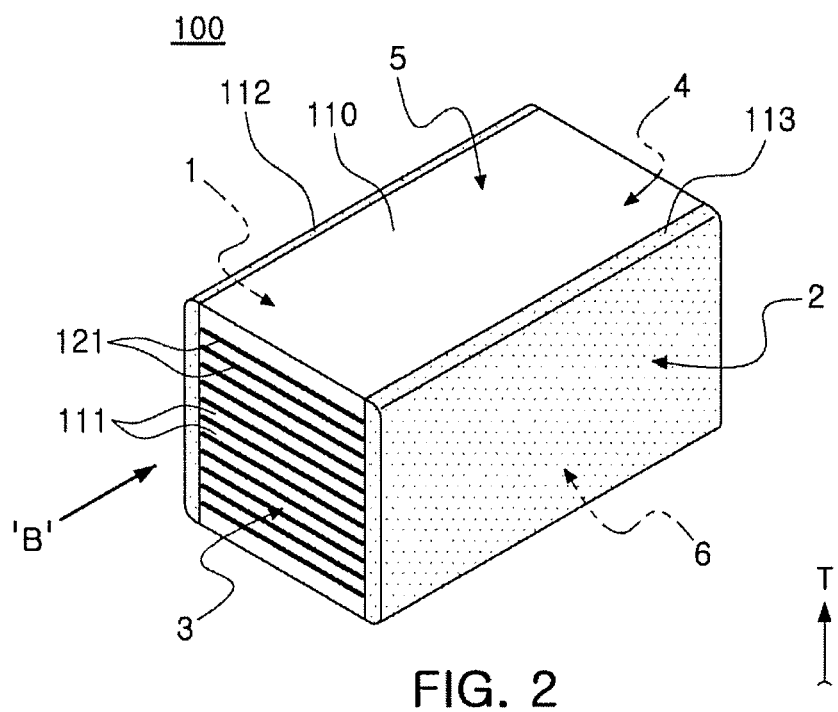
FIG. 2 is a perspective view illustrating an appearance of a ceramic body of FIG. 1.

FIG. 2 is a perspective view illustrating an appearance of a ceramic body of FIG. 1.

Figure 3:
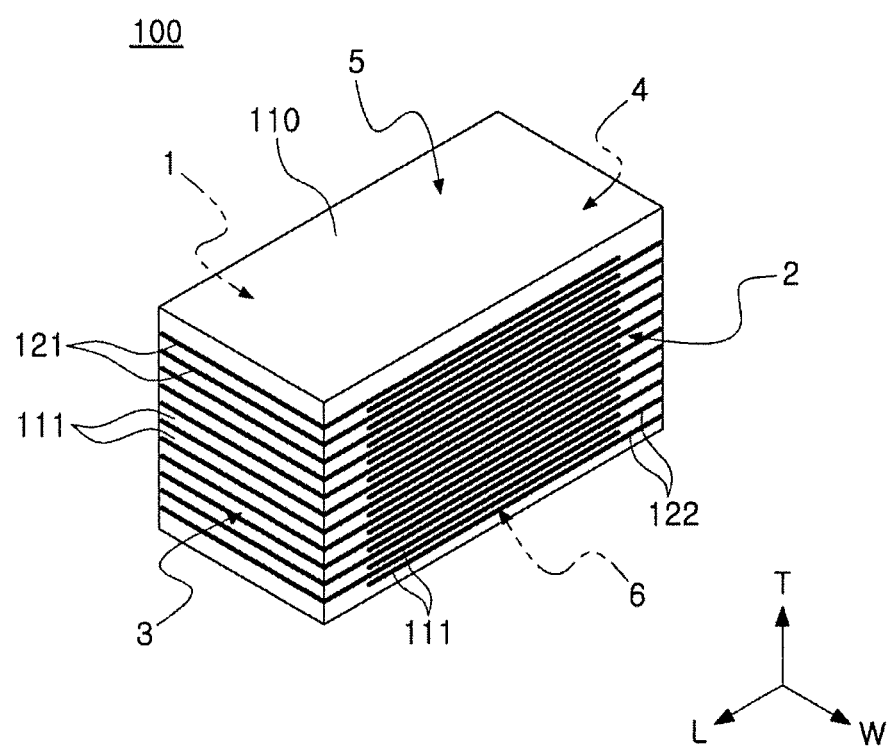
FIG. 3 is a perspective view illustrating a ceramic green sheet multilayer body before the ceramic body of FIG. 2 is sintered.

FIG. 3 is a perspective view illustrating a ceramic green sheet multilayer body before the ceramic body of FIG. 2 is sintered.

Figure 4:
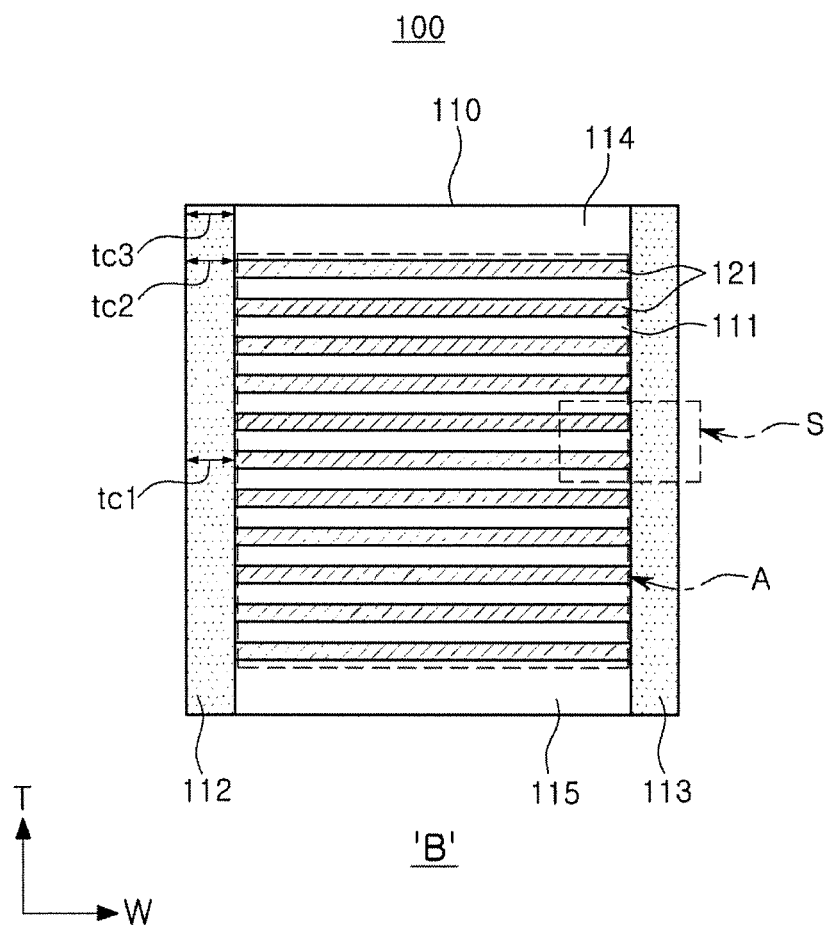
FIG. 4 is a side view when viewed in direction B of FIG. 2.

FIG. 4 is a side view when viewed in direction B of FIG. 2.

Referring to FIGS. 1 through 4, a multilayer ceramic capacitor 100 according to the present exemplary embodiment may include a ceramic body 110, a plurality of internal electrodes 121 and 122 disposed in the ceramic body 110, and external electrodes 131 and 132 disposed on outer surfaces of the ceramic body 110.

The ceramic body 110 may have first and second surfaces 1 and 2 opposing each other, third and fourth surfaces 3 and 4 connecting the first and second surfaces to each other, and fifth and sixth surfaces 5 and 6, which are upper and lower surfaces, respectively.

The first and second surfaces 1 and 2 refer to surfaces of the ceramic body 110 opposing each other in a width direction, which is a second direction, the third and fourth surfaces 3 and 4 refer to surfaces of the ceramic body 110 opposing each other in a length direction, which is a first direction, and the fifth and sixth surfaces 5 and 6 refer to surfaces of the ceramic body 110 opposing each other in a thickness direction, which is a third direction.

A shape of the ceramic body 110 is not particularly limited, but may be a rectangular parallelepiped shape as illustrated.

One ends of the plurality of internal electrodes 121 and 122 disposed in the ceramic body 110 may be exposed to the third surface 3 or the fourth surface 4 of the ceramic body 110.

The internal electrodes 121 and 122 may have a pair of first and second internal electrodes 121 and 122 having different polarities.

One ends of the first internal electrodes 121 may be exposed to the third surface 3, and one ends of the second internal electrodes 122 may be exposed to the fourth surface 4.

The other ends of the first internal electrodes 121 and the second internal electrodes 122 may be disposed to be spaced apart from the third surface 3 or the fourth surface 4 by a predetermined interval.

First and second external electrodes 131 and 132 may be disposed on the third and fourth surfaces 3 and 4 of the ceramic body 110, respectively, and may be electrically connected to the internal electrodes.

The multilayer ceramic capacitor 100 according to an exemplary embodiment in the present disclosure may include the plurality of internal electrodes 121 and 122 disposed in the ceramic body 110, exposed to the first and second surfaces 1 and 2, and having one ends exposed to the third surface 3 or the fourth surface 4, and first and second side margin portions 112 and 113 disposed on side portions of the internal electrodes 121 and 122 exposed to the first and second surfaces 1 and 2, respectively.

The plurality of internal electrodes 121 and 122 may be disposed in the ceramic body 110, the respective side portions of the plurality of internal electrodes 121 and 122 may be exposed to the first and second surfaces 1 and 2, which are surfaces of the ceramic body 110 in the width direction, and the first and second side margin portions 112 and 113 may be disposed on the exposed side portions.

An average thickness of each of the first and second side margin portions 112 and 113 may be 2 μm or more to 10 μm or less.

According to an exemplary embodiment in the present disclosure, the ceramic body 110 may include a laminate in which a plurality of dielectric layers 111 are stacked and the first and second side margin portions 112 and 113 disposed on opposite side surfaces of the laminate, respectively.

The plurality of dielectric layers 111 may be in a sintered state, and adjacent dielectric layers may be integrated with each other so that boundaries therebetween are not readily apparent.

A length of the ceramic body 110 may correspond to a distance from the third surface 3 of the ceramic body 110 to the fourth surface 4 of the ceramic body 110.

A length of the dielectric layer 111 may form a distance between the third and fourth surfaces 3 and 4 of the ceramic body 110.

According to an exemplary embodiment in the present disclosure, the length of the ceramic body 110 may be 400 to 1400 μm, but is not limited thereto. More specifically, the length of the ceramic body 110 may be 400 to 800 μm or may be 600 to 1400 μm.

The internal electrodes 121 and 122 may be disposed on the dielectric layers 111, and the internal electrodes 121 and 122 may be disposed in the ceramic body 110 with each of the dielectric layers interposed therebetween, by sintering.

Referring to FIG. 3, the first internal electrodes 121 may be disposed on the dielectric layers 111. The first internal electrodes 121 may not be entirely disposed on the dielectric layers in the length direction of the dielectric layers. That is, one end of the first internal electrode 121 may be disposed up to the third surface 3 to be exposed to the third surface 3, and the other end of the first internal electrode 121 may be disposed to be spaced apart from the fourth surface 4 of the ceramic body 110 by a predetermined interval.

The end portion of the first internal electrode exposed to the third surface 3 of the ceramic body 110 may be connected to the first external electrode 131.

On the contrary to the first internal electrode, one end of the second internal electrode 122 may be exposed to the fourth surface 4 to be connected to the second external electrode 132, and the other end of the second internal electrode 122 may be disposed to be spaced apart from the third surface 3 by a predetermined interval.

Four hundred or more internal electrodes may be stacked in order to implement a high-capacitance multilayer ceramic capacitor, but the number of internal electrodes is not necessarily limited thereto.

The dielectric layer 111 may have the same width as that of the first internal electrode 121. That is, the first internal electrodes 121 may be entirely disposed on the dielectric layers in the width direction of the dielectric layers 111.

According to an exemplary embodiment in the present disclosure, the width of the dielectric layer and the width of the internal electrode may be 100 to 900 µm, but are not limited thereto. More specifically, the width of the dielectric layer and the width of the internal electrode may be 100 to 500 µm or may be 100 to 900 µm.

As the ceramic body is miniaturized, a thickness of each of the side margin portions may have an influence on electrical characteristics of the multilayer ceramic capacitor. According to an exemplary embodiment in the present disclosure, each of the side margin portions may be formed at a thickness of 10 µm or less, such that characteristics of a miniaturized multilayer ceramic capacitor may be improved.

That is, each of the side margin portions may be formed at the thickness of 10 µm or less, such that an overlapping area between the internal electrodes forming capacitance may be secured as much as possible to implement a high-capacitance and miniature multilayer ceramic capacitor.

The ceramic body 110 may include an active portion A contributing to forming capacitance of a capacitor, and upper and lower cover portions 114 and 115 disposed as upper and lower margin portions on upper and lower surfaces of the active portion A, respectively.

The active portion A may be formed by repeatedly stacking a plurality of first and second internal electrodes 121 and 122 with each of the dielectric layers 111 interposed therebetween.

The upper and lower cover portions 114 and 115 may be formed of the same material as that of the dielectric layer 111 and have the same configuration as that of the dielectric layer 111 except that they do not include the internal electrodes.

That is, the upper and lower cover portions 114 and 115 may include a ceramic material such as a barium titanate ($BaTiO_3$)-based ceramic material.

Each of the upper and lower cover portions 114 and 115 may have a thickness of 20 µm or less, but is not necessarily limited thereto.

In an exemplary embodiment in the present disclosure, the internal electrodes and the dielectric layers, which are simultaneously cut and formed, may be formed at the same width. More detailed contents for this will be described below.

In the present exemplary embodiment, the dielectric layers may be formed at the same width as that of the internal electrodes, and the side portions of the internal electrodes 121 and 122 may thus be exposed to the first and second surfaces of the ceramic body 110 in the width direction.

The first and second side margin portions 112 and 113 may be disposed, respectively, on opposite side surfaces of the ceramic body 110 in the width direction to which the side portions of the internal electrodes 121 and 122 are exposed.

Each of the first and second side margin portions 112 and 113 may have the thickness of 10 µm or less. The smaller the thickness of each of the first and second side margin portions 112 and 113, the greater the overlapping area between the internal electrodes disposed in the ceramic body 110.

The thickness of each of the first and second side margin portions 112 and 113 is not particularly limited as long as a short-circuit between the internal electrodes exposed to the side surfaces of the ceramic body 110 may be prevented, and may be, for example, 2 µm or more.

When the thickness of each of the first and second side margin portions 112 and 113 is less than 2 µm, mechanical strength against external impact may be decreased, and when the thickness of each of the first and second side margin portions 112 and 113 exceeds 10 µm, the overlapping area between the internal electrodes may be relatively decreased, such that it may be difficult to secure a high capacitance of the multilayer ceramic capacitor.

In order to significantly increase capacitance of the multilayer ceramic capacitor, a method of decreasing a thickness of each of the dielectric layers, a method of increasing the number of stacked dielectric layers each of which a thickness is decreased, a method of increasing a coverage of each of the internal electrodes, and the like, have been considered.

In addition, a method of increasing the overlapping area between the internal electrodes forming the capacitance has been considered.

In order to increase the overlapping area between the internal electrodes, a margin portion region in which the internal electrodes are not disposed needs to be significantly decreased.

Particularly, as the multilayer ceramic capacitor is miniaturized, the margin portion region needs to be significantly decreased in order to increase the overlapping area between the internal electrodes.

According to the present exemplary embodiment, the internal electrodes may be disposed over the entirety of the dielectric layers in the width direction of the dielectric layers, and each of the side margin portions may be set to 10 µm or less, such that the overlapping area between the internal electrodes may be great.

Generally, as the number of stacked dielectric layers is increased, thicknesses of the dielectric layers and the internal electrodes may be decreased. Therefore, a phenomenon in which the internal electrodes are short-circuited may frequently occur. In addition, when the internal electrodes are disposed on only portions of the dielectric layers, a step due to the internal electrodes may be generated, such that an insulation resistance or reliability of the multilayer ceramic capacitor may be decreased.

However, according to the present exemplary embodiment, even though the internal electrodes and the dielectric layers formed of thin films are formed, the internal electrodes may be entirely disposed on the dielectric layers in the width direction of the dielectric layers, and the overlapping area between the internal electrodes may thus be increased, such that the capacitance of the multilayer ceramic capacitor may be increased.

In addition, the step due to the internal electrodes may be decreased, such that the insulation resistance may be improved, and a multilayer ceramic capacitor having excellent capacitance characteristics and excellent reliability may be provided.

Figure 5:
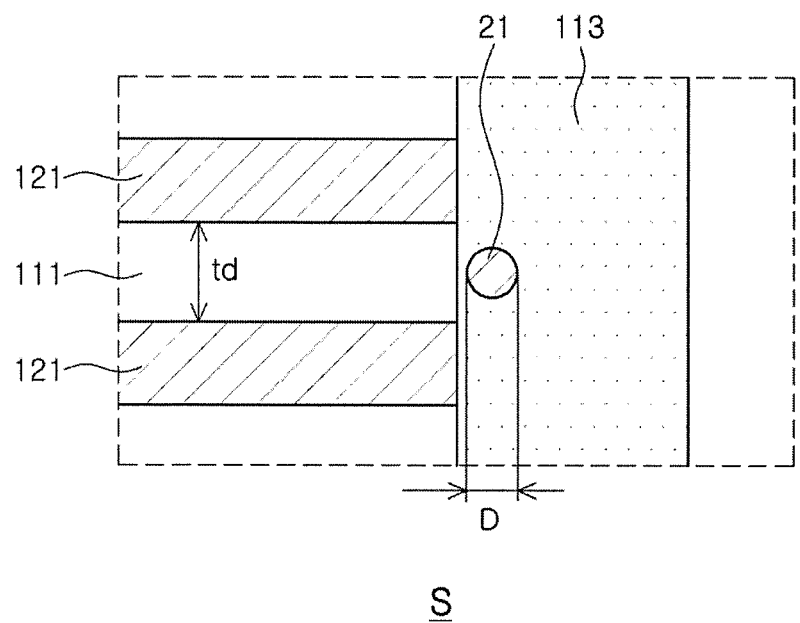
FIG. 5 is an enlarged view of region S of FIG. 4.

FIG. 5 is an enlarged view of region S of FIG. 4.

Referring to FIG. 5, in the multilayer ceramic capacitor according to an exemplary embodiment in the present disclosure, a metal or a metal oxide 21 may be disposed in the first and second side margin portions 112 and 113, a ratio of a diameter D of the metal or the metal oxide 21 to a thickness td of the dielectric layer 111 may be 0.8 or less.

When the side margin portions are separately attached to electrode exposed surfaces of the ceramic body 110 in the width direction in a process before sintering of processes of manufacturing the multilayer ceramic capacitor as in an exemplary embodiment in the present disclosure, in a process of forming the side margin portions, a metal included in the internal electrode or an oxide of the metal may be disposed in the side margin portions, and reliability of the multilayer ceramic capacitor may be decreased due to the metal or the oxide of the metal.

In detail, an effect of decreasing a distance between the internal electrodes appears due to the metal or the oxide of the metal generated in the side margin portion, such that electric field concentration is generated, resulting in a short-circuit.

That is, when a neutral conductor permeates between the internal electrodes having a potential difference, electric chargers in the neutral conductor may be rearranged depending on a property of the neutral conductor, and the neutral conductor in which the electric charges are rearranged may have the same effect as that of an electrode to decrease the distance between the internal electrodes, such that electric field strength between the internal electrodes may be increased.

When the metal or the oxide of the metal, which is the neutral conductor, permeates into the side margin portion, the possibility that a short-circuit will occur may be increased due to an electric field strength increase effect between the internal electrodes.

According to an exemplary embodiment in the present disclosure, a particle size of the metal or the metal oxide 21 generated in each of the first and second side margin portions 112 and 113 may be controlled to predict an electric field concentration amount, resulting in a reduction in the short-circuit.

In detail, the metal or the metal oxide 21 may be disposed in each of the first and second side margin portions 112 and 113, and the ratio of the diameter D of the metal or the metal oxide 21 to the thickness td of the dielectric layer 111 may be controlled to be 0.8 or less to control an electric field increased in the internal electrodes, resulting in the reduction in the short-circuit.

The metal or the metal oxide 21 may be disposed in each of the first and second side margin portions 112 and 113, and when the ratio of the diameter D of the metal or the metal oxide 21 to the thickness td of the dielectric layer 111 exceeds 0.8, the diameter D of the metal or the metal oxide 21 having the same effect as that of the electrode may be increased, such that the distance between the internal electrodes may be decreased, resulting in the short-circuit.

On the other hand, in an exemplary embodiment in the present disclosure, the smaller the diameter D of the metal or the metal oxide 21, the lower the possibility that the short-circuit will occur. Therefore, a lower limit value of the ratio of the diameter D of the metal or the metal oxide 21 to the thickness td of the dielectric layer 111 is not particularly specified.

In the metal or the metal oxide 21, the metal may be nickel (Ni), and the metal oxide may be an oxide including nickel (Ni) and magnesium (Mg), but the metal and the metal oxide 21 are not necessarily limited thereto.

When the first and second internal electrodes 121 and 122 include nickel (Ni), the metal or the metal oxide 21 disposed in each of the first and second side margin portions 112 and 113 may be nickel (Ni) or an oxide including nickel (Ni) and magnesium (Mg), as described above.

As another example, when the first and second internal electrodes 121 and 122 include a metal other than nickel (Ni), the metal or the metal oxide 21 disposed in each of the first and second side margin portions 112 and 113 may also be the metal other than nickel (Ni) or an oxide of the metal.

The metal or the metal oxide 21 may be disposed in regions of the first and second side margin portions 112 and 113 adjacent to the dielectric layer 111.

In an exemplary embodiment in the present disclosure, since the metal or the metal oxide 21 may permeate into each of the first side margin portion 112 and the second side margin portion 113 when the side margin portions are separately attached to the electrode exposed surfaces of the ceramic body 110 in the width direction in the process before the sintering, as described above, and there is a limitation in diffusion of the metal or the metal oxide 21 into each of the side margin portions, the metal or the metal oxide 21 may be disposed in the regions of the first and second side margin portions 112 and 113 adjacent to the dielectric layer 111.

Particularly, the regions of the first and second side margin portions 112 and 113 adjacent to the dielectric layer 111 may be regions between the first and second internal electrodes 121 and 122.

When the metal or the metal oxide 21 is disposed in the regions between the first and second internal electrodes 121 and 122 in the regions of the first and second side margin portions 112 and 113 adjacent to the dielectric layer 111, the electric field concentration between the internal electrodes may be generated.

In other words, when separate margin portions are not attached as in a method of manufacturing a multilayer ceramic capacitor according to the related art, the possibility that the metal or the metal oxide will be disposed in margin portions of the ceramic body in the width direction may be low, and the possibility that the metal or the metal oxide will be disposed particularly in margin portions of the ceramic body in the width direction, adjacent to the dielectric layer may be low.

Therefore, the feature that the metal or the metal oxide 21 is disposed in the regions of the first and second side margin portions 112 and 113 adjacent to the dielectric layer 111 may be a unique phenomenon of the present disclosure, and in an exemplary embodiment in the present disclosure, the diameter of the metal or the metal oxide 21 may be controlled to control the electric field concentration between the internal electrodes, resulting in the reduction in the short-circuit.

Particularly, the multilayer ceramic capacitor according to an exemplary embodiment in the present disclosure may be a subminiature and high-capacitance multilayer ceramic capacitor in which a thickness of the dielectric layer 111 is 0.4 μm or less and a thickness of each of the internal electrodes 121 and 122 is 0.4 μm or less.

As in an exemplary embodiment in the present disclosure, in a case of the subminiature and high-capacitance multilayer ceramic capacitor in which the dielectric layer 111 and the internal electrodes 121 and 122 formed of thin films having the thickness of 0.4 μm or less are used, a reliability problem due to the short-circuit caused by the electric field concentration between the internal electrodes may be a very important issue.

That is, as compared to the multilayer ceramic capacitor according to the related art, technology according an exemplary embodiment in the present disclosure is applied to the subminiature and high-capacitance multilayer ceramic capacitor in which the thickness of the dielectric layer 111 is 0.4 µm or less and the thickness of each of the internal electrodes 121 and 122 is 0.4 µm or less. Therefore, the thickness of the dielectric layer may be small, such that the distance between the internal electrode may be small, resulting in an increase in the possibility that the electric field will be concentrated.

In addition to the subminiature and high-capacitance multilayer ceramic capacitor, in an exemplary embodiment in the present disclosure, the side margin portions may be separately attached to the electrode exposed surfaces of the ceramic body 110 in the width direction in the process before the sintering. Therefore, in the process of forming the side margin portions, the metal or the metal oxide included in the internal electrodes may be disposed in the side margin portions.

In this case, as described above, the metal or the metal oxide may serve as an electrode, such that the effect of further decreasing the distance between the internal electrodes appears. Therefore, the possibility that the short-circuit will occur due to the electric field concentration may further be increased.

However, as in an exemplary embodiment in the present disclosure, in the subminiature and high-capacitance multilayer ceramic capacitor in which the separate side margin portions are attached, the ratio of the diameter ID of the metal or the metal oxide 21 to the thickness td of the dielectric layer 111 may be controlled to be 0.8 or less, such that reliability of the multilayer ceramic capacitor may be improved even in a case in which the dielectric layer 111 and the first and second internal electrodes 121 and 122 are formed of the thin films having the thickness of 0.4 µm or less.

However, the thin films do not mean that the thicknesses of the dielectric layer 111 and the first and second internal electrodes 121 and 122 are 0.4 µm or less, but may conceptually include that the thicknesses of the dielectric layer and the internal electrodes are smaller than those of the multilayer ceramic capacitor according to the related art.

In an exemplary embodiment in the present disclosure, in a method of controlling the ratio of the diameter D of the metal or the metal oxide 21 to the thickness td of the dielectric layer 111 to be 0.8 or less, the diameter D of the metal or the metal oxide 21 may be controlled by controlling a sintering temperature profile or controlling a temperature rise speed in a sintering process after the first and second side margin portions 112 and 113 are disposed on the side surfaces of the ceramic body 110 in the width direction.

Referring to FIG. 4, a ratio of a thickness tc2 of a region of the first or second side margin portion 112 or 113 in contact with a distal end of an internal electrode disposed at the outermost side portion to a thickness tc1 of a region of the first or second side margin portion 112 or 113 in contact with a distal end of an internal electrode disposed in a central portion, among the plurality of internal electrodes 121 and 122 may be 1.0 or less.

A lower limit value of the ratio of the thickness tc2 of the region of the first or second side margin portion 112 or 113 in contact with the distal end of the internal electrode disposed at the outermost side portion to the thickness tc1 of the region of the first or second side margin portion 112 or 113 in contact with the distal end of the internal electrode disposed at the central portion is not particularly limited, and may be 0.9 or more.

According to an exemplary embodiment in the present disclosure, the first or second side margin portion 112 or 113 may be formed by attaching a ceramic green sheet to the side surface of the ceramic body unlike the related art, and a thickness of the first or second side margin portion 112 or 113 at each position may thus be constant.

That is, in the related art, the side margin portion is formed in a manner of applying or printing a ceramic slurry, and a deviation of a thickness of the side margin portion at each position is thus large.

In detail, in the related art, the thickness of the region of the first or second side margin portion in contact with the distal end of the internal electrode disposed at the central portion of the ceramic body is greater than those of other regions.

For example, in the related art, the ratio of the thickness of the region of the first or second side margin portion in contact with the distal end of the internal electrode disposed at the outermost side portion to the thickness of the region of the first or second side margin portion in contact with the distal end of the internal electrode disposed at the central portion is less than about 0.9, such that the deviation of the thickness is large.

In the related art in which the deviation of the thickness of the side margin portion at each position is large, a portion occupied by the side margin portion in a multilayer ceramic capacitor having the same size is large, such that a large size of a capacitance forming portion may not be secured, resulting in difficulty in securing a high capacitance.

On the other hand, in an exemplary embodiment in the present disclosure, an average thickness of each of the first and second side margin portions 112 and 113 may be 2 µm or more to 10 µm or less, and the ratio of the thickness tc2 of the region of the first or second side margin portion 112 or 113 in contact with the distal end of the internal electrode disposed at the outermost side portion to the thickness tc1 of the region of the first or second side margin portion 112 or 113 in contact with the distal end of the internal electrode disposed at the central portion among the plurality of internal electrodes 121 and 122 may be 0.9 or more to 1.0 or less. Therefore, the thickness of the side margin portion may be small and the deviation of the thickness of the side margin portion may be small, such that a large size of the capacitance forming portion may be secured.

In an exemplary embodiment in the present disclosure, the first or second side margin portion 112 or 113 may be formed by attaching the ceramic green sheet to the side surface of the ceramic body unlike the related art, and the thickness of the first or second side margin portion 112 or 113 at each position may thus be constant.

Therefore, a high-capacitance multilayer ceramic capacitor may be implemented.

Meanwhile, referring to FIG. 4, a ratio of a thickness tc3 of a region of the first or second side margin portion 112 or 113 in contact with an edge of the ceramic body 110 to the thickness tc1 of the region of the first or second side margin portion 112 or 113 in contact with the distal end of the internal electrode disposed at the central portion among the plurality of internal electrodes 121 and 122 may be 1.0 or less.

A lower limit value of the ratio of the thickness tc3 of the region of the first or second side margin portion 112 or 113 in contact with the edge of the ceramic body 110 to the thickness tc1 of the region of the first or second side margin portion 112 or 113 in contact with the distal end of the internal electrode disposed at the central portion may be 0.9 or more.

Due to the feature described above, a deviation of the thickness of the side margin portion in each region may be small, such that the large size of the capacitance forming portion may be secured. Therefore, the high-capacitance multilayer ceramic capacitor may be implemented.

FIGS. 6A through 6F are schematic cross-sectional views and schematic perspective views illustrating a method of manufacturing a multilayer ceramic capacitor according to another exemplary embodiment in the present disclosure.

According to another exemplary embodiment in the present disclosure, a method of manufacturing a multilayer ceramic capacitor may include: preparing first ceramic green sheets on which a plurality of first internal electrodes patterns are disposed at predetermined intervals and second ceramic green sheets on which a plurality of second internal electrodes patterns are disposed at predetermined intervals, forming a ceramic green sheet multilayer body by stacking the first and second ceramic green sheets so that the first internal electrodes patterns and the second internal electrodes patterns intersect each other, cutting the ceramic green sheet multilayer body to have side surfaces on which distal ends of the first internal electrodes patterns and the second internal electrodes patterns are exposed in a width direction, forming a first side margin portion and a second side margin portion, respectively, on the side surfaces to which the distal ends of the first internal electrodes patterns and the second internal electrodes patterns are exposed, and preparing a ceramic body including dielectric layers and first and second internal electrodes by sintering the cut ceramic green sheet multilayer body, wherein a metal or a metal oxide is disposed in each of the first and second side margin portions, and a ratio of a diameter of the metal or the metal oxide to a thickness of the dielectric layer is 0.8 or less.

The method of manufacturing a multilayer ceramic capacitor according to another exemplary embodiment in the present disclosure will hereinafter be described.

Figure 6A:
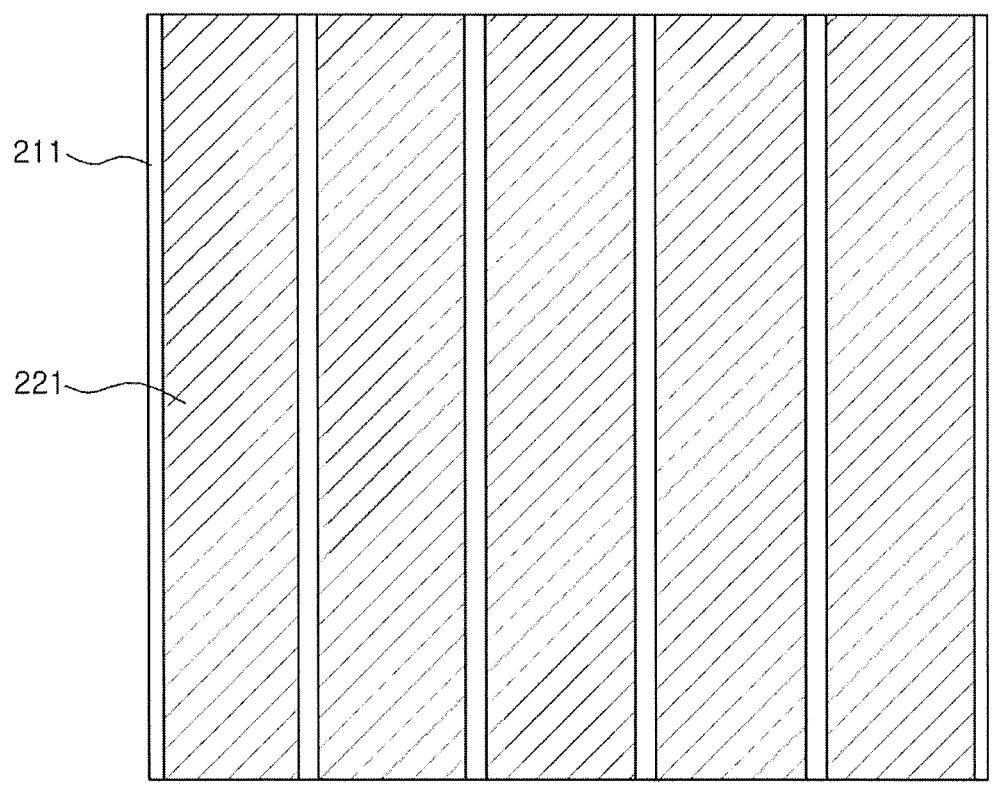
FIGS. 6A through 6F are schematic cross-sectional views and schematic perspective views illustrating a method of manufacturing a multilayer ceramic capacitor according to another exemplary embodiment in the present disclosure.

As illustrated in FIG. 6A, the plurality of first internal electrode patterns 221 having a stripe shape may be disposed at the predetermined intervals on the ceramic green sheet 211. The plurality of first internal electrode patterns 221 having the stripe shape may be disposed in parallel with one another.

The ceramic green sheet 211 may be formed of a ceramic paste including ceramic powders, an organic solvent, and an organic binder.

The ceramic powder, which is a material having a high dielectric constant, may be a barium titanate ($BaTiO_3$) based material, a lead composite perovskite based material, a strontium titanate ($SrTiO_3$) based material, or the like, and may be preferably a barium titanate ($BaTiO_3$) powder, but is not limited thereto. When the ceramic green sheet 211 is sintered, the ceramic green sheet 211 may become a dielectric layer 111 constituting the ceramic body 110.

The first internal electrode patterns 221 having the stripe shape may be formed of an internal electrode paste containing a conductive metal. The conductive metal may be nickel (Ni), copper (Cu), palladium (Pd), or alloys thereof, but is not limited thereto.

A method of forming the first internal electrode patterns 221 having the stripe shape on the ceramic green sheet 211 is not particularly limited, but may be a printing method such as a screen printing method or a gravure printing method.

In addition, although not illustrated, the plurality of second internal electrode patterns 222 having a stripe shape may be disposed at the predetermined intervals on another ceramic green sheet 211.

Hereinafter, the ceramic green sheet on which the first internal electrode patterns 221 are disposed may be referred to as a first ceramic green sheet, and the ceramic green sheet on which the second internal electrode patterns 222 are disposed may be referred to as a second ceramic green sheet.

Figure 6B:
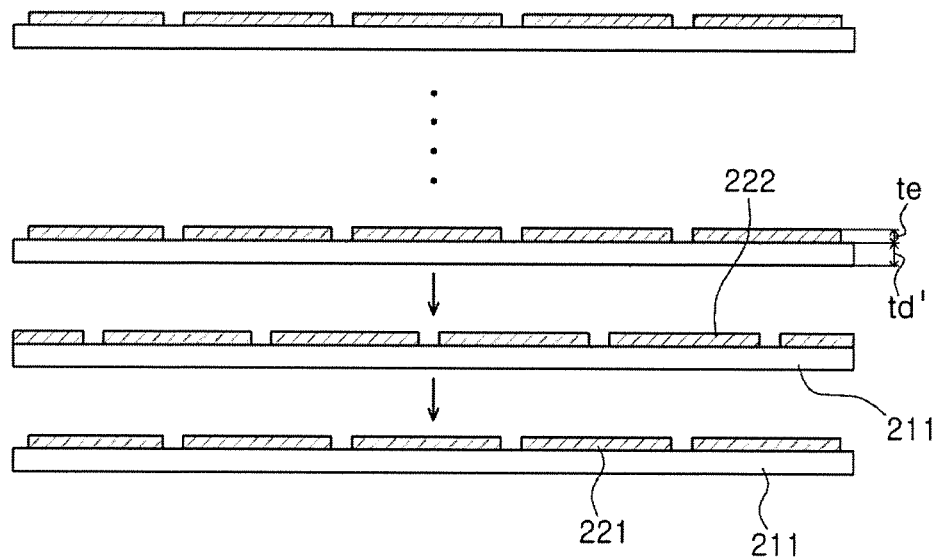

Then, as illustrated in FIG. 6B, the first and second ceramic green sheets may be alternately stacked so that the internal electrode patterns 221 having the stripe shape and the second internal electrode patterns 222 having the stripe shape are alternately stacked.

Afterward, the first internal electrode patterns 221 having the stripe shape may become the first internal electrode 121, and the second internal electrode patterns 222 having the stripe shape may become the second internal electrode 122.

According to another exemplary embodiment in the present disclosure, a thickness td' of each of the first and second ceramic green sheets may be 0.6 μm or less, and a thickness te of each of the first and second internal electrode patterns may be 0.5 μm or less.

Since the subminiature and high-capacitance multilayer ceramic capacitor in which the dielectric layer and the internal electrodes are formed of the thin films having the thickness of 0.4 μm or less is provided in the present disclosure, the thickness td' of each of the first and second ceramic green sheets may be 0.6 μm or less, and the thickness te of each of the first and second internal electrode patterns may be 0.5 μm or less.

Figure 6C:
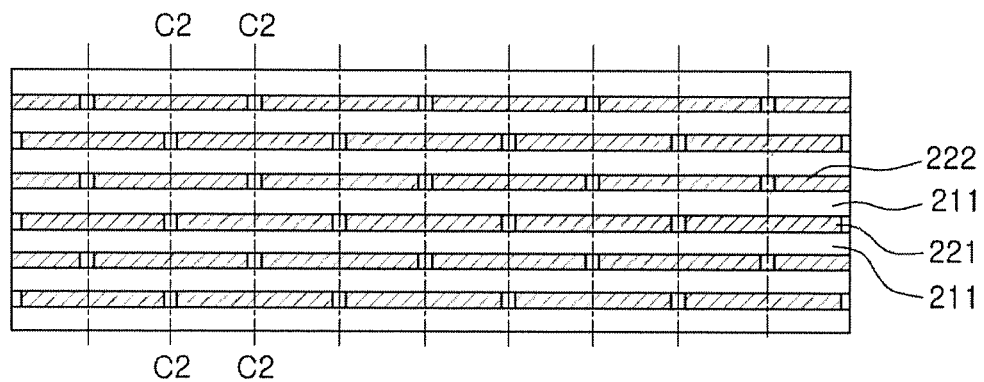
Figure 6D:
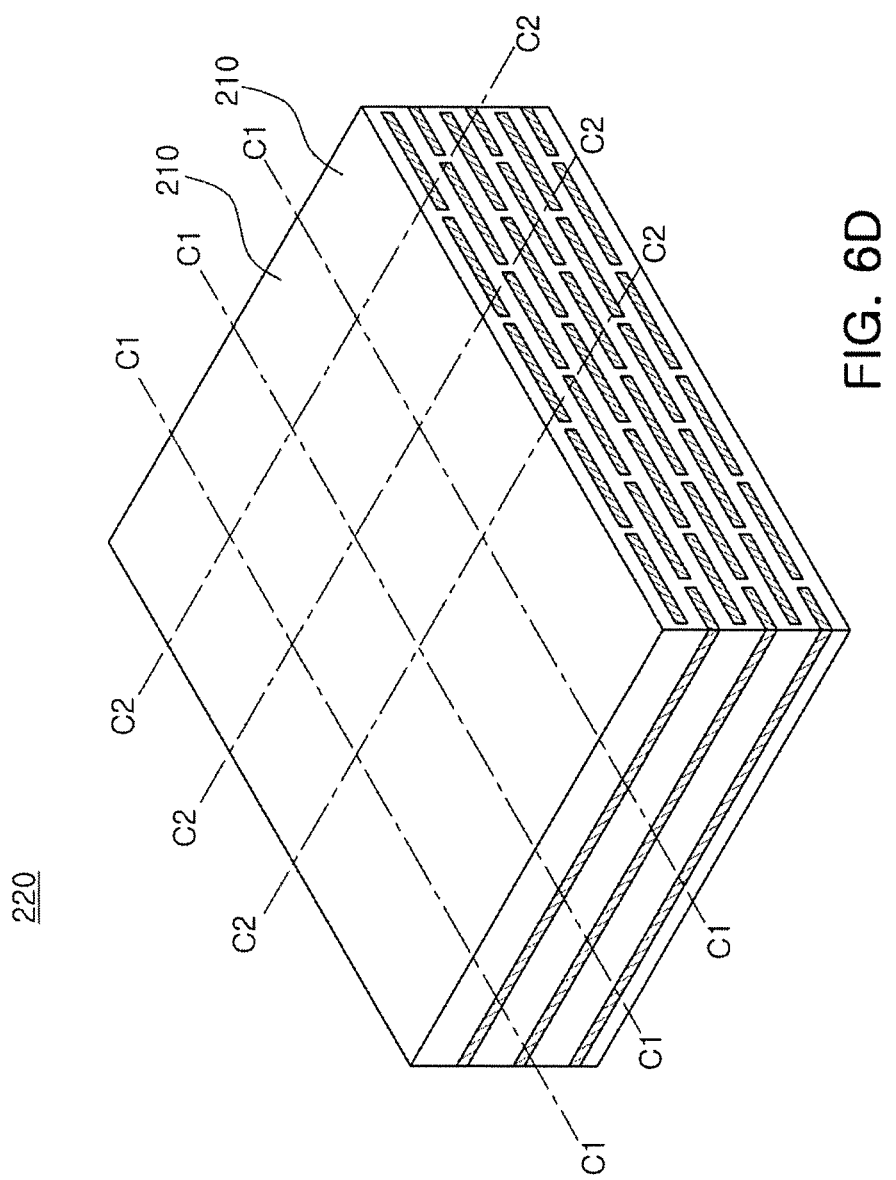

FIG. 6C is a cross-sectional view illustrating a ceramic green sheet multilayer body 220 in which the first and second ceramic green sheets are stacked according to another exemplary embodiment in the present disclosure, and FIG. 6D is a perspective view illustrating the ceramic green sheet multilayer body 220 in which the first and second ceramic green sheets are stacked.

Referring to FIGS. 6C and 6D, the first ceramic green sheets on which the plurality of first internal electrode patterns 221 parallel with one another and having the stripe shape are printed and the second ceramic green sheets on which the plurality of second internal electrode patterns 222 having parallel with one another and having the stripe shape are printed may be alternately stacked.

In more detail, the first ceramic green sheets and the second ceramic green sheets may be stacked so that central portions of the first internal electrode patterns 221 having the stripe shape, printed on the first ceramic green sheets and intervals between the second internal electrode patterns 222 having the stripe shape, printed on the second ceramic green sheets overlap each other.

Then, as illustrated in FIG. 6D, the ceramic green sheet multilayer body 220 may be cut across the plurality of first internal electrode patterns 221 having the stripe shape and the plurality of second internal electrode patterns 222 having the stripe shape. That is, the ceramic green sheet multilayer body 220 may be cut along cut lines C1-C1 and C2-C2 intersecting with each other to become multilayer bodies 210.

In more detail, the first internal electrode patterns 221 having the stripe shape and the second internal electrode patterns 222 having the stripe shape may be cut in the length direction to be divided into a plurality of internal electrodes having a predetermined width. In this case, the stacked ceramic green sheets may be cut together with the internal electrode patterns. Therefore, the dielectric layers may be formed to have the same width as that of the internal electrodes.

In addition, the ceramic green sheet multilayer body may be cut at individual ceramic body sizes along the cut lines C2-C2. That is, before the first and second side margin portions are formed, a laminate having a bar shape may be cut at the individual ceramic body sizes along the cut lines C2-C2 to form a plurality of multilayer bodies 210.

That is, the laminate having the bar shape may be cut so that central portions of the first internal electrodes and predetermined intervals disposed between the second internal electrodes, which overlap each other, are cut by the same cut lines. Therefore, one ends of the first and second internal electrodes may be alternately exposed to cut surfaces.

Then, the first and second side margin portions may be disposed on first and second side surfaces of the multilayer body 210.

Figure 6E:
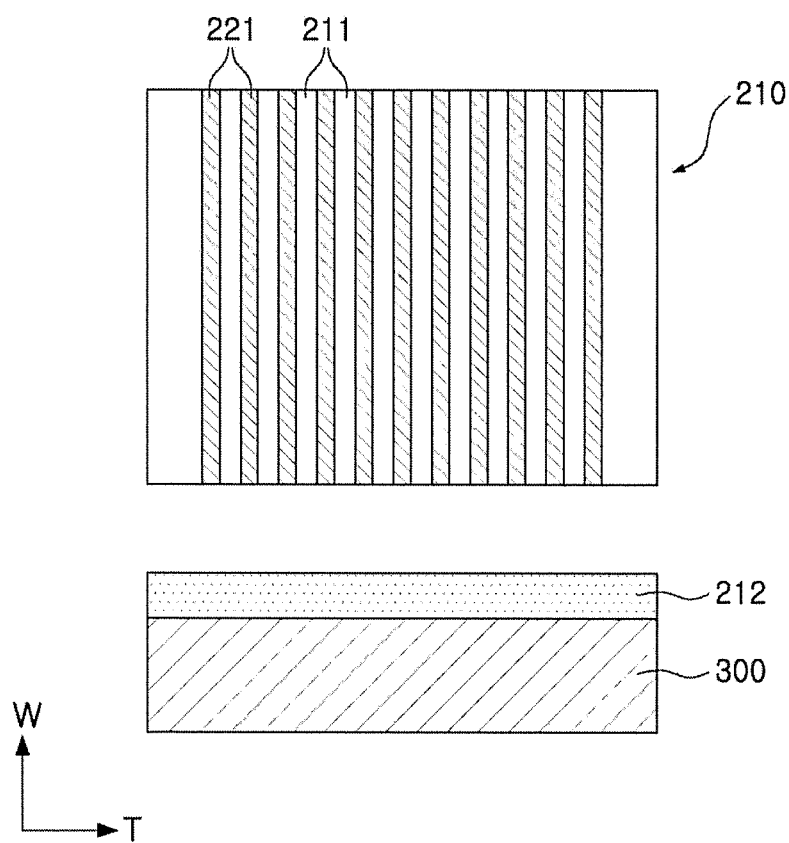

Then, as illustrated in FIG. 6E, the first side margin portion 212 and the second side margin portion (not illustrated) may be disposed on the first and second side surfaces of the multilayer body 210, respectively.

In detail, in a method of forming the first side margin portion 212, a ceramic green sheet 212 for a side surface to which an adhesive (not illustrated) is applied may be disposed on a punching elastic material 300 formed of rubber.

Then, the multilayer body 210 may be rotated by 90° so that the first side surface of the multilayer body 210 faces the ceramic green sheet 212 for a side surface to which the adhesive (not illustrated) is applied, and the multilayer body 210 may then be pressed and closely adhered to the ceramic green sheet 212 for a side surface to which the adhesive (not illustrated) is applied.

When the ceramic green sheet 212 for a side surface is transferred to the multilayer body 210 by pressing and closely adhering the multilayer body 210 to the ceramic green sheet 212 for a side surface to which the adhesive (not illustrated) is applied, the ceramic green sheet 212 for a side surface may be formed up to an edge portion of the side surface of the multilayer body 210 due to the punching elastic material 300 formed of the rubber, and the remaining portions may be cut.

Figure 6F:
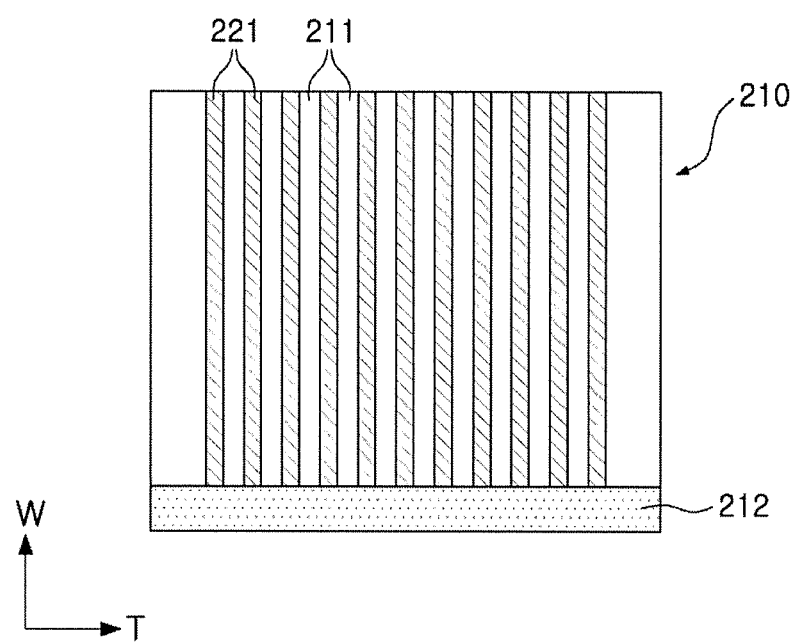

FIG. 6F illustrates that the ceramic green sheet 212 for a side surface is formed up to the edge portion of the side surface of the multilayer body 210.

Then, the multilayer body 210 may be rotated, and the second side margin portion may be disposed on the second side surface of the multilayer body 210.

Then, the multilayer body 210 having the first and second side margin portions disposed on opposite side surfaces thereof, respectively, may be calcinated and sintered to form the ceramic body including the dielectric layers and the first and second internal electrodes.

According to another exemplary embodiment in the present disclosure, the adhesive is applied to the ceramic green sheet 212 for a side surface, and the ceramic green sheet 212 for a side surface may thus be transferred to the side surface of the multilayer body 210 under a low temperature and low pressure condition unlike the related art.

Therefore, damage to the multilayer body 210 may be significantly decreased, such that deterioration of electrical characteristics of the multilayer ceramic capacitor after the sintering may be prevented, and reliability of the multilayer ceramic capacitor may be improved.

In addition, the ceramic green sheet 212 for a side surface to which the adhesive is applied may be transferred to the side surface of the multilayer body 210 and be pressed in a sintering process to increase close adhesion between the multilayer body and the ceramic green sheet for a side surface.

Then, external electrodes may be disposed, respectively, on the third side surface of the ceramic body to which the first internal electrodes are exposed and the fourth side surface of the ceramic body to which the second internal electrodes are exposed.

According to another exemplary embodiment in the present disclosure, a thickness of the ceramic green sheet for a side surface may be small and a deviation of the thickness of the ceramic green sheet for a side surface may be small, such that the large size of the capacitance forming portion may be secured.

In detail, an average thickness of each of the first and second side margin portions 112 and 113 after the sintering may be 2 μm or more to 10 μm or less, and the deviation of the thickness of each of the first and second side margin portions 112 and 113 at each position may be small, such that the large size of the capacitance forming portion may be secured.

Therefore, a high-capacitance multilayer ceramic capacitor may be implemented.

A description for features that are the same as those in the exemplary embodiment in the present disclosure described above will be omitted in order to avoid an overlapping description.

Hereinafter, the present disclosure will be described in more detail through Experimental Example. However, Experimental Example is to assist in the detailed understanding of the present disclosure, and the scope of the present disclosure is not limited by Experimental Example.

Experimental Example

A multilayer ceramic capacitor according to Inventive Example was manufactured so that the metal or the metal oxide 21 is disposed in the first and second side margin portions 112 and 113, a ratio of a diameter D of the metal or the metal oxide 21 to a thickness td of the dielectric layer 111 is 0.8 or less, and a multilayer ceramic capacitor according to Comparative Example was manufactured by the method according to the related art.

In addition, a ceramic green sheet multilayer body was formed to form side margin portions by attaching ceramic green sheets for a side surface to electrode exposed portions of a green chip that does not have margins due to exposure of internal electrodes in a width direction as in Comparative Example and Inventive Example.

Multilayer ceramic capacitor green chips having a 0603 size (width×length×height is 0.6 mm×0.3 mm×0.3 mm) were manufactured by applying a predetermined temperature and pressure under a condition in which deformation of the chips is significantly suppressed to attach the ceramic green sheets for a side surface to opposite surfaces of the ceramic green sheet multilayer bodies.

Multilayer ceramic capacitor specimens of which the manufacture is completed as described above were subjected to a calcinating process in a nitrogen atmosphere at 400° C. or less, and were sintered under a condition of a hydrogen concentration of 0.5% $H_2$ or less at a sintering temperature of 1200° C. or less. Then, electrical characteristics of the multilayer ceramic capacitor specimens, such as a short-circuit, and the like, were generally confirmed.

As a measurement result of the above experiment, it was confirmed that in Comparative Example, a rate of defects such as short-circuits is high.

On the other hand, it may be confirmed that in Inventive Example in which the metal or the metal oxide 21 is disposed in each of the first and second side margin portions 112 and 113, and the ratio of the diameter D of the metal or the metal oxide 21 to the thickness td of the dielectric layer 111 is 0.8 or less, a defective rate is less than 5%, such that reliability is excellent.

As set forth above, according to an exemplary embodiment in the present disclosure, a size of a nickel particle or a nickel oxide disposed in the side margin portion disposed on the side surface of the ceramic body may be controlled to prevent the electric field concentration between the internal electrodes, resulting in the reduction in the short-circuit.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
a ceramic body including dielectric layers and having first and second surfaces opposing each other, third and fourth surfaces opposing each other and connecting the first and second surfaces to each other, and fifth and sixth surfaces opposing each other and connected to the first to fourth surfaces;
a plurality of internal electrodes disposed in the ceramic body, each exposed to the first and second surfaces and having one end exposed to the third or fourth surface; and
a first side margin portion and a second side margin portion disposed, respectively, on the first and second surfaces of the ceramic body,
wherein a metal oxide including nickel (Ni) and magnesium (Mg) is disposed in each of the first and second side margin portions, and a ratio of a diameter of the metal oxide to a thickness of each of the dielectric layers is 0.8 or less.

2. The multilayer ceramic capacitor of claim 1, wherein the metal oxide is disposed in regions of the first and second side margin portions adjacent to the dielectric layers.

3. The multilayer ceramic capacitor of claim 1, wherein a ratio of a thickness of a region of the first or second side margin portion in contact with a distal end of an outermost layer among the plurality of internal electrodes to a thickness of a region of the first or second side margin portion in contact with a distal end of a central layer among the plurality of internal electrodes ranges from 0.9 to 1.0 s.

4. The multilayer ceramic capacitor of claim 1, wherein a ratio of a thickness of a region of the first or second side margin portion in contact with an edge of the ceramic body to a thickness of a region of the first or second side margin portion in contact with a distal end of a central layer among the plurality of internal electrodes ranges from 0.9 to 1.0.

5. The multilayer ceramic capacitor of claim 1, wherein the thickness of each of the dielectric layers is 0.4 μm or less, and a thickness of each internal electrode is 0.4 μm or less.

6. The multilayer ceramic capacitor of claim 1, wherein an average thickness of each of the first and second side margin portions ranges from 2 μm to 10 μm.

7. The multilayer ceramic capacitor of claim 1, wherein the ceramic body includes an active portion in which capacitance is formed by including the plurality of internal electrodes disposed to face each other with each of the dielectric layers interposed therebetween, and cover portions disposed on upper and lower surfaces of the active portion, respectively, and
a thickness of each of the cover portions is 20 μm or less.

8. A method of manufacturing a multilayer ceramic capacitor, comprising:
preparing first ceramic green sheets on which a plurality of first internal electrodes patterns are disposed at predetermined intervals and second ceramic green sheets on which a plurality of second internal electrodes patterns are disposed at predetermined intervals;
forming a ceramic green sheet multilayer body by stacking the first and second ceramic green sheets, wherein the first internal electrodes patterns and the second internal electrodes patterns intersect each other;
cutting the ceramic green sheet multilayer body to have side surfaces on which distal ends of the first internal electrodes patterns and the second internal electrodes patterns are exposed in a width direction;
forming a first side margin portion and a second side margin portion, respectively, on the side surfaces to which the distal ends of the first internal electrodes patterns and the second internal electrodes patterns are exposed; and
preparing a ceramic body including dielectric layers and internal electrodes by sintering the cut ceramic green sheet multilayer body,
wherein a metal oxide including nickel (Ni) and magnesium (Mg) is disposed in each of the first and second side margin portions, and a ratio of a diameter of the metal oxide to a thickness of each of the dielectric layers is 0.8 or less.

9. The method of claim 8, wherein the metal oxide is disposed in regions of the first and second side margin portions adjacent to the dielectric layers.

10. The method of claim 8, wherein a thickness of each of the first and second ceramic green sheets is 0.6 μm or less, and a thickness of each of the first and second internal electrode patterns is 0.5 μm or less.

11. The method of claim 8, wherein a ratio of a thickness of a region of the first or second side margin portion in contact with a distal end of an outermost layer among the internal electrodes to a thickness of a region of the first or second side margin portion in contact with a distal end of a central layer among the internal electrodes ranges from 0.9 to 1.0.

12. The method of claim 8, wherein a ratio of a thickness of a region of the first or second side margin portion in contact with an edge of the ceramic green sheet multilayer body to a thickness of a region of the first or second side margin portion in contact with a distal end of a central layer among the internal electrodes ranges from 0.9 to 1.0.

13. The method of claim 8, wherein an average thickness of each of the first and second side margin portions ranges from 2 μm to 10 μm.

14. The method of claim 8, wherein the ceramic body includes an active portion in which capacitance is formed by including the internal electrodes disposed to face each other with each of the dielectric layers interposed therebetween and cover portions disposed on upper and lower surfaces of the active portion, respectively, and
a thickness of each of the cover portions is 20 μm or less.

15. The method of claim 8, wherein the thickness of each of the dielectric layers is 0.4 μm or less, and a thickness of each internal electrode is 0.4 μm or less.

16. A multilayer ceramic capacitor comprising:
a ceramic body including dielectric layers and having first and second surfaces opposing each other, third and fourth surfaces opposing each other and connecting the first and second surfaces to each other, and fifth and sixth surfaces opposing each other and connected to the first to fourth surfaces and opposing each other;

a plurality of internal electrodes disposed in the ceramic body, each exposed to the first and second surfaces and having one ends exposed to the third or fourth surface; and a first side margin portion and a second side margin portion disposed, respectively, on the first and second surfaces of the ceramic body, wherein a metal oxide including nickel (Ni) and magnesium (Mg) is disposed in each of the first and second side margin portions, and a diameter of the metal oxide is smaller than a thickness of each of the dielectric layers.

17. The multilayer ceramic capacitor of claim 16, wherein a ratio of the diameter of the metal oxide to the thickness of each of the dielectric layers is 0.8 or less.

18. The multilayer ceramic capacitor of claim 16, wherein the thickness of each of the dielectric layers is 0.4 μm or less, and a thickness of each internal electrode is 0.4 μm or less.

* * * * *